United States Patent Office 2,727,065
Patented Dec. 13, 1955

2,727,065

PREPARATION OF MERCAPTOPROPIONIC ACIDS

Constantine E. Anagnostopoulos, Waltham, Mass., assignor to Monsanto Chemical Company, St. Louis, Mo., a corporation of Delaware No Drawing. Application December 31, 1953,
Serial No. 401,723

6 Claims. (Cl. 260—535)

This invention relates to the preparation of hydroxy-mercaptopropionic acids. More particularly the invention relates to novel methods of preparing alpha-hydroxy-beta-mercaptopropionic acid and derivatives thereof.

It is a primary object of the invention to provide methods for the manufacture of hydroxy-mercaptopropionic acids and derivatives which are highly useful as additives to poultry feed compositions.

Still further objects and advantages of the invention will become apparent from the following description and appended claims.

According to the present invention the hydroxy-mercaptopropionic acids are prepared by reacting an inorganic thiosulfate with a hydroxy chloropropionic acid and acidifying the reaction mixture. The process is preferably carried out by mixing a solution of an alkali metal thiosulfate, such as sodium or potassium thiosulfate, with alpha-hydroxy-beta-chloropropionic acid, allowing the resulting solution to react for at least 5 minutes at a temperature between 20 and 100° C., acidifying the reaction mixture, and isolating the alpha-hydroxy-beta-mercaptopropionic acid which forms by any suitable method. By way of example, the process will be described in detail with respect to alpha-hydroxy-beta-mercaptopropionic acid and sodium thiosulfate.

The process is carried out by adding an aqueous solution containing 5 to 80% of sodium thiosulfate to an aqueous solution containing 5 to 80% of alpha-hydroxy-beta-chloropropionic acid which has previously been brought to a pH of about 7 by the addition of sodium carbonate or other alkali metal carbonate or hydroxide. Preferably a 5 to 25% molar excess of sodium thiosulfate is used. The addition of the thiosulfate is carried out at a temperature between 20 and 100° C. The reaction mixture is then allowed to stand for 1 to 4 hours at a temperature between 20 and 100° C., after which it is made acidic, preferably to a pH of 4 by the slow addition of aqueous mineral acid, such as sulfuric or hydrochloric acid. The acidic mixture is then heated to a temperature between 30 and 100° C., and kept at this temperature for 1 to 4 hours. The mixture is then filtered to remove any solids present, and the clear filtrate is extracted with ether. The ether extract is then dried and the ether is evaporated under vacuum, preferably at an absolute pressure of about 20 to 25 mm. of Hg. The oily residue which remains soon solidifies to crystalline alpha-hydroxy-beta-mercaptopropionic acid. However crystallization does not always take place, as in some instances the oily residue remains as an oil.

Instead of neutralizing the hydroxy chloropropionic acid by adding sodium carbonate to the aqueous solution, the acid may be only partly neutralized, or this step may be omitted entirely. However the best yields are obtained when at least 80 to 90% of the acid is neutralized. Instead of sodium carbonate any other alkali metal or alkaline earth metal salt or base, such as sodium hydroxide or calcium hydroxide, can be added in order to neutralize the acid partially or completely.

Instead of extracting the reaction product from its aqueous solution by means of ether, other water-immiscible solvents can be used, if desired, such as chloroform, carbon bisulfide or the like. The hydroxy-mercaptopropionic acid can also be isolated by other methods, such as by passing the water solution of alpha-hydroxy-beta-mercaptopropionic acid through an ion-exchange resin, such as Dowex 50, to remove all metal cations and then eluting the resin, thereby obtaining separate solutions containing the organic and inorganic acids, after which the water is completely removed from the organic acid by evaporation under reduced pressure.

As a further alternative the hydroxy-mercaptopropionic acid can be precipitated from the aqueous solution in which it is prepared as the insoluble cuprous mercaptide by the addition of cuprous oxide. The acid can also be separated by adding an alkaline earth metal hydroxide or carbonate to the aqueous solution in which it is formed, after which it is precipitated as the alkaline earth metal salt by the addition of methyl or ethyl alcohol or by evaporation of the water to dryness. Suitable alkaline earth metal hydroxides or carbonates for this purpose include the hydroxides or carbonates of calcium, barium or magnesium.

Instead of adding the sodium thiosulfate solution to the aqueous solution of the hydroxy-mercaptopropionic acid, as described above, the propionic acid solution can be added to the sodium thiosulfate solution with equally good results. The procedure otherwise remains the same as hereinbefore described.

Having obtained the free alpha-hydroxy-beta-mercaptopropionic acid it is relatively simple to make certain derivatives of the acid including the ammonium salt, the alkali metal salts, such as the sodium or potassium salt, and alkaline earth metal salts, such as the calcium, barium or magnesium salt. These derivatives are in general prepared by carefully neutralizing an aqueous solution of the alpha-hydroxy-beta-mercaptopropionic acid with the corresponding metal hydroxide or carbonate or ammonium hydroxide or carbonate. Isolation of the salts thus obtained can be effected by evaporating the aqueous solution to dryness under reduced pressure and preferably under an inert atmosphere, such as for example, nitrogen.

The compounds of this invention, which may be prepared as hereinbefore described, are primarily useful as additives to poultry feed compositions. Thus, in general it has been found that when small quantities of these compounds, e. g. from 0.005 to 1% by weight, based on the feed or ration, are incorporated in the feed, they tend to promote the growth of the poultry and/or to improve the efficiency of feed utilization by the poultry. The amounts of feed additive employed are dependent on the particular poultry feed composition used. In general the preferred amounts range between 0.4 and 0.8% by weight, based on the weight of the entire feed composition.

A further understanding of the compounds of this invention and their preparation will be obtained from the following examples, in which the parts and percentages given are by weight unless otherwise specified.

EXAMPLE I

*Preparation of alpha-hydroxy-beta-mercaptopropionic acid*

A solution of 69 grams of alpha-hydroxy-beta-chloropropionic acid (0.56 mol) in 50 ml. of water was added dropwise to a well-stirred solution of 107 grams of sodium thiosulfate (0.69 mol) in 61 ml. of water. The addition took 15 minutes and the reaction mixture was maintained at 80° C. After standing an additional 2 hours at 85° C., it was filtered to remove any solids present and the filtrate was cooled to room temperature, and enough 67% sulfuric acid was added to bring the pH of the mixture to about 5. The acidic mixture was then heated at 90° C. for 3 hours. It was then filtered to remove any solids present, decolorized by the addition of carbon black and filtered again. The clear filtrate was extracted continuously with diethyl ether for 10 hours. The ether extract was separated, dried over anhydrous sodium sulfate, and the ether evaporated under an absolute pressure of 25 mm. of Hg. The oily residue upon cooling solidified to crystalline alpha-hydroxy-beta-mercaptopropionic acid having a melting point of 58 to 61° C. The product was found to be soluble in water, ethanol, acetone, ethyl acetate and to a less degree in chloroform, but was insoluble in petroleum ether.

Calculated on the basis of $C_3H_6O_3S$: C=29.50%, H=4.95%, S=26.25%. Found by analysis: C=29.4%, H=5.1%, S=26.5%.

The infra-red spectrum of the product taken in mineral oil showed the presence of hydroxyl group (3.0 microns), sulfhydryl group (3.95 microns), and acid carbonyl group (5.9 microns). The neutralization equivalent with standard alkali gave a value of 124. The calculated value for $C_3H_6O_3S$ is 123.14.

EXAMPLE II

*Preparation of alpha-hydroxy-beta-mercaptopropionic acid*

A solution of 79 grams of sodium thiosulfate (0.5 mol) in 45 ml. of water was added dropwise to a well-stirred solution of 62 grams of alpha-hydroxy-beta-chloropropionic acid in 75 ml. of water which was previously brought to a pH of 7 by the careful addition of a 25% aqueous sodium hydroxide solution. The addition took 10 minutes and the reaction mixture was maintained between 25 and 30° C. After standing for an additional ½ hour at 35° C., it was filtered to remove any solids present and enough 67% sulfuric acid was added to bring the pH of the mixture to about 4. The acidic mixture was then heated at 28° C. for 3 hours. It was then filtered to remove any solids present, decolorized by the addition of carbon black and filtered again. The clear filtrate was then extracted continuously with diethyl ether for 10 hours. The ether extract was separated, dried over anhydrous sodium sulfate, and the ether evaporated under an absolute pressure of 25 mm. of Hg. The oily residue upon cooling solidified to crystalline alpha-hydroxy-beta-mercaptopropionic acid, which was found by comparison of the infra-red spectra to be identical with the product obtained in Example I.

EXAMPLE III

*Preparation of calcium alpha-hydroxy-beta-mercaptopropionate*

To a solution of 12.3 grams (0.1 mol) of alpha-hydroxy-beta-mercaptopropionic acid in 50 ml. of absolute ethanol were added 6 grams of calcium hydroxide and the mixture stirred and heated on the steam bath for about 10 minutes. Any excess calcium hydroxide was then filtered off and the clear alcoholic filtrate cooled to room temperature. Addition of ethyl ether caused a white precipitate to appear which was found to be calcium alpha-hydroxy-beta-mercaptopropionic acid.

Calculated on the basis of $(C_3H_5O_3S)_2Ca$ (molecular weight 284.36): Ca=14.09%. Found by analysis, 14.2%.

The infra-red spectrum taken in mineral oil indicates hydroxy group (3.0 microns), sulfhydryl group (3.98 microns, very weak) and acid salt carbonyl group (6.2 microns, broad).

EXAMPLE IV

*Preparation of sodium alpha-hydroxy-beta-mercaptopropionate*

A solution of 6.1 grams (0.05 mol) of alpha-hydroxy-beta-mercaptopropionic acid in 25 ml. of water was brought to a pH of 7 by the careful addition of a 25% aqueous sodium hydroxide solution. Evaporation to dryness at an absolute pressure of about 12 mm. of Hg and under an atmosphere of nitrogen left a solid residue which upon washing with diethyl ether and drying was found to be sodium alpha-hydroxy-beta-mercaptopropionate. Calculated on the basis of $C_3H_5O_3SNa$ (molecular weight 146.14): Na=15.73%. Found by analysis, 16.0%. The infra-red spectrum taken in mineral oil indicates hydroxy group (3.0 microns), sulfhydryl group (3.95 microns, very weak) and acid salt carbonyl group (6.2 microns, broad).

What is claimed is:

1. The method of preparing alpha-hydroxy-beta-mercaptopropionic acid which comprises reacting an alkali metal thiosulfate with a hydroxy chloropropionic acid, and acidifying the reaction mixture.

2. The method of preparing alpha-hydroxy-beta-mercaptopropionic acid which comprises mixing a solution of an alkali metal thiosulfate with alpha-hydroxy-beta-chloropropionic acid at a temperature between 20° C. and 100° C., acidifying the mixture with mineral acid and isolating the alpha-hydroxy-beta-mercaptopropionic acid from the resulting solution.

3. The method of preparing alpha-hydroxy-beta-mercaptopropionic acid which comprises mixing an aqueous solution containing 5 to 80% of an alkali metal thiosulfate with an aqueous solution containing 5 to 80% of alpha-hydroxy-beta-chloropropionic acid, heating the resulting solution to a temperature between 20 and 100° C. for at least 5 minutes, acidifying the reaction mixture with mineral acid, and then isolating the alpha-hydroxy-beta-mercaptopropionic acid formed.

4. The method of preparing alpha-hydroxy-beta-mercaptopropionic acid which comprises mixing an aqueous solution containing 5 to 80% of an alkali metal thiosulfate with an aqueous solution, containing 5 to 80% of a substance selected from the group consisting of alkali metal or alkaline earth metal salts of alpha-hydroxy-beta-chloropropionic acid, heating the resulting solution to a temperature betweeen 20 and 100° C. for at least 5 minutes, acidifying the solution with mineral acid, and isolating the alpha-hydroxy-beta-mercaptopropionic acid formed.

5. The method of preparing alpha-hydroxy-beta-mercaptopropionic acid which comprises mixing an aqueous solution containing 5 to 80% of an alkali metal thiosulfate with an aqueous solution containing 5 to 80% of a mixture of alpha-hydroxy-beta-chloropropionic acid and a substance selected from the group consisting of alkali metal or alkaline earth metal salts of alpha-hydroxy-beta-chloropropionic acid, heating the resulting solution to a temperature betweeen 20 and 100° C. for at least 5 minutes, acidifying the solution with mineral acid, and isolating the alpha-hydroxy-beta-mercaptopropionic acid formed.

6. The method of preparing alpha-hydroxy-beta-mercaptopropionic acid which comprises mixing an aqueous solution containing 5 to 80% of an alkali metal thiosulfate with an aqueous solution containing 5 to 80% of alpha-hydroxy-beta-chloropropionic acid, heating the resulting solution to a temperature between 20 and 100° C. for 1 to 4 hours, acidifying the reaction mixture with mineral acid, maintaining the acidic mixture at a temperature between 30 and 100° C. for 1 to 4 hours, and then isolating the alpha-hydroxy-beta-mercaptopropionic acid formed.

No references cited.